(12) United States Patent
Pocas et al.

(10) Patent No.: US 12,380,252 B2
(45) Date of Patent: Aug. 5, 2025

(54) SYSTEM AND METHOD FOR FABRIC-INDEPENDENT IN-BAND PRIVACY FOR SECURITY COMMANDS ON NON-VOLATILE MEMORY EXPRESS OVER FABRICS (NVMe-oF)

(71) Applicant: Dell Products L.P., Round Rock, TX (US)

(72) Inventors: Jamie Pocas, Milford, MA (US); Naizhong Chiu, Newton, MA (US); Saoni Mukherjee, Westborough, MA (US)

(73) Assignee: Dell Products L.P., Round Rock, TX (US)

( * ) Notice: Subject to any disclaimer, the term of this patent is extended or adjusted under 35 U.S.C. 154(b) by 210 days.

(21) Appl. No.: 17/869,902

(22) Filed: Jul. 21, 2022

(65) Prior Publication Data

US 2024/0028774 A1  Jan. 25, 2024

(51) Int. Cl.
*H04L 9/00* (2022.01)
*G06F 15/173* (2006.01)
*G06F 21/60* (2013.01)
*G06F 21/78* (2013.01)

(52) U.S. Cl.
CPC ........ *G06F 21/78* (2013.01); *G06F 15/17331* (2013.01); *G06F 21/602* (2013.01)

(58) Field of Classification Search
CPC ... G06F 21/78; G06F 15/17331; G06F 21/602
USPC .......................................................... 726/26
See application file for complete search history.

(56) References Cited

U.S. PATENT DOCUMENTS

| | | | |
|---|---|---|---|
| 11,934,322 B1* | 3/2024 | Miller | G06F 9/546 |
| 2019/0377892 A1* | 12/2019 | Ben Dayan | H04L 9/0841 |
| 2022/0100687 A1* | 3/2022 | Sahin | G06F 3/067 |
| 2022/0382914 A1* | 12/2022 | Anchi | H04L 9/083 |
| 2023/0336574 A1* | 10/2023 | Rozenbaum | G06N 3/08 |

\* cited by examiner

*Primary Examiner* — Christopher J Brown
(74) *Attorney, Agent, or Firm* — Brian J. Colandreo; Heath M. Sargeant; Holland & Knight LLP

(57) ABSTRACT

A method, computer program product, and computing system for receiving content for securely transmitting from an initiator device across a fabric to a target device. The content may be encrypted with a predefined encryption key, thus defining encrypted content. The encrypted content may be encapsulated in a Non-volatile Memory Express (NVMe) Over Fabrics (NVMe-oF) command, thus defining an encapsulated NVMe-oF security command. The encapsulated NVMe-oF security command may be transmitted across the fabric to the target device.

20 Claims, 6 Drawing Sheets

SYSTEM AND METHOD FOR FABRIC-INDEPENDENT IN-BAND PRIVACY FOR SECURITY COMMANDS ON NON-VOLATILE MEMORY EXPRESS OVER FABRICS (NVMe-oF)

BACKGROUND

Storing and safeguarding electronic content may be beneficial in modern business and elsewhere. Accordingly, various methodologies may be employed to protect and distribute such electronic content.

Storage centers are moving from large monolithic storage arrays to evermore decentralized storage. With Non-volatile Memory Express (NVMe), NVMe commands may be processed and sent from a host system over fabric to a drive installed on a remote system. This can be done with minimal changes to the initiating host's kernel and no apparent changes to its userspace applications. Further, self-encrypting drives (SEDs) that comply with Trusted Computing Group's (TCG) Opal Specification satisfy the common business requirement for data at rest encryption (D@RE) by using a media encryption key (MEK) to encrypt the data on the storage media and allowing access to the data through the input/output (TO) interface only after a shared secret passphrase, known as a PIN, has been provided by the host, authenticating it. However, conventional fabrics do not provide transport encryption.

SUMMARY OF DISCLOSURE

In one example implementation, a computer-implemented method executed on a computing device may include, but is not limited to, receiving content for securely transmitting from an initiator device across a fabric to a target device. The content may be encrypted with a predefined encryption key, thus defining encrypted content. The encrypted content may be encapsulated in a Non-volatile Memory Express (NVMe) Over Fabrics (NVMe-oF) command, thus defining an encapsulated NVMe-oF security command. The encapsulated NVMe-oF security command may be transmitted across the fabric to the target device.

One or more of the following example features may be included. The fabric may include a NVMe Over Fabrics (NVMe-oF) storage environment. The NVMe-oF storage environment may include one or more of: a Transmission Control Protocol (TCP) fabric; a Fibre Channel (FC) fabric; and a Random Direct Memory Access (RDMA) fabric. Encryption key information may be exchanged between the initiator device and the target device. Receiving the content may include receiving, from a userspace of the initiator device, a security command including the content and a plurality of encryption parameters. Receiving the content may include: receiving, from a userspace of the initiator device, a standard security command including the content; and converting, at a kernel of the initiator device, the standard security command to a security command with a plurality of encryption parameters. The content of the encapsulated NVMe-oF security command may be de-encapsulated at the target device. In response to de-encapsulating the security command from the encapsulated NVMe-oF security command at the target device, the content may be decrypted.

In another example implementation, a computer program product resides on a computer readable medium that has a plurality of instructions stored on it. When executed by a processor, the instructions cause the processor to perform operations that may include, but are not limited to, receiving content for securely transmitting from an initiator device across a fabric to a target device. The content may be encrypted with a predefined encryption key, thus defining encrypted content. The encrypted content may be encapsulated in a Non-volatile Memory Express (NVMe) Over Fabrics (NVMe-oF) command, thus defining an encapsulated NVMe-oF security command. The encapsulated NVMe-oF security command may be transmitted across the fabric to the target device. One or more of the following example features may be included. The fabric may include a NVMe Over Fabrics (NVMe-oF) storage environment. The NVMe-oF storage environment may include one or more of: a Transmission Control Protocol (TCP) fabric; a Fibre Channel (FC) fabric; and a Random Direct Memory Access (RDMA) fabric. Encryption key information may be exchanged between the initiator device and the target device. Receiving the content may include receiving, from a userspace of the initiator device, a security command including the content and a plurality of encryption parameters. Receiving the content may include: receiving, from a userspace of the initiator device, a standard security command including the content; and converting, at a kernel of the initiator device, the standard security command to a security command with a plurality of encryption parameters. The content of the encapsulated NVMe-oF security command may be de-encapsulated at the target device. In response to de-encapsulating the security command from the encapsulated NVMe-oF security command at the target device, the content may be decrypted.

In another example implementation, a computing system includes at least one processor and at least one memory architecture coupled with the at least one processor, wherein the at least one processor is configured to receiving content for securely transmitting from an initiator device across a fabric to a target device. The content may be encrypted with a predefined encryption key, thus defining encrypted content. The encrypted content may be encapsulated in a Non-volatile Memory Express (NVMe) Over Fabrics (NVMe-oF) command, thus defining an encapsulated NVMe-oF security command. The encapsulated NVMe-oF security command may be transmitted across the fabric to the target device.

One or more of the following example features may be included. The fabric may include a NVMe Over Fabrics (NVMe-oF) storage environment. The NVMe-oF storage environment may include one or more of: a Transmission Control Protocol (TCP) fabric; a Fibre Channel (FC) fabric; and a Random Direct Memory Access (RDMA) fabric. Encryption key information may be exchanged between the initiator device and the target device. Receiving the content may include receiving, from a userspace of the initiator device, a security command including the content and a plurality of encryption parameters. Receiving the content may include: receiving, from a userspace of the initiator device, a standard security command including the content; and converting, at a kernel of the initiator device, the standard security command to a security command with a plurality of encryption parameters. The content of the encapsulated NVMe-oF security command may be de-encapsulated at the target device. In response to de-encapsulating the security command from the encapsulated NVMe-oF security command at the target device, the content may be decrypted.

The details of one or more example implementations are set forth in the accompanying drawings and the description below. Other possible example features and/or possible example advantages will become apparent from the description, the drawings, and the claims. Some implementations

BRIEF DESCRIPTION OF THE DRAWINGS

Like reference symbols in the various drawings indicate like elements.

DETAILED DESCRIPTION

Figure 1:
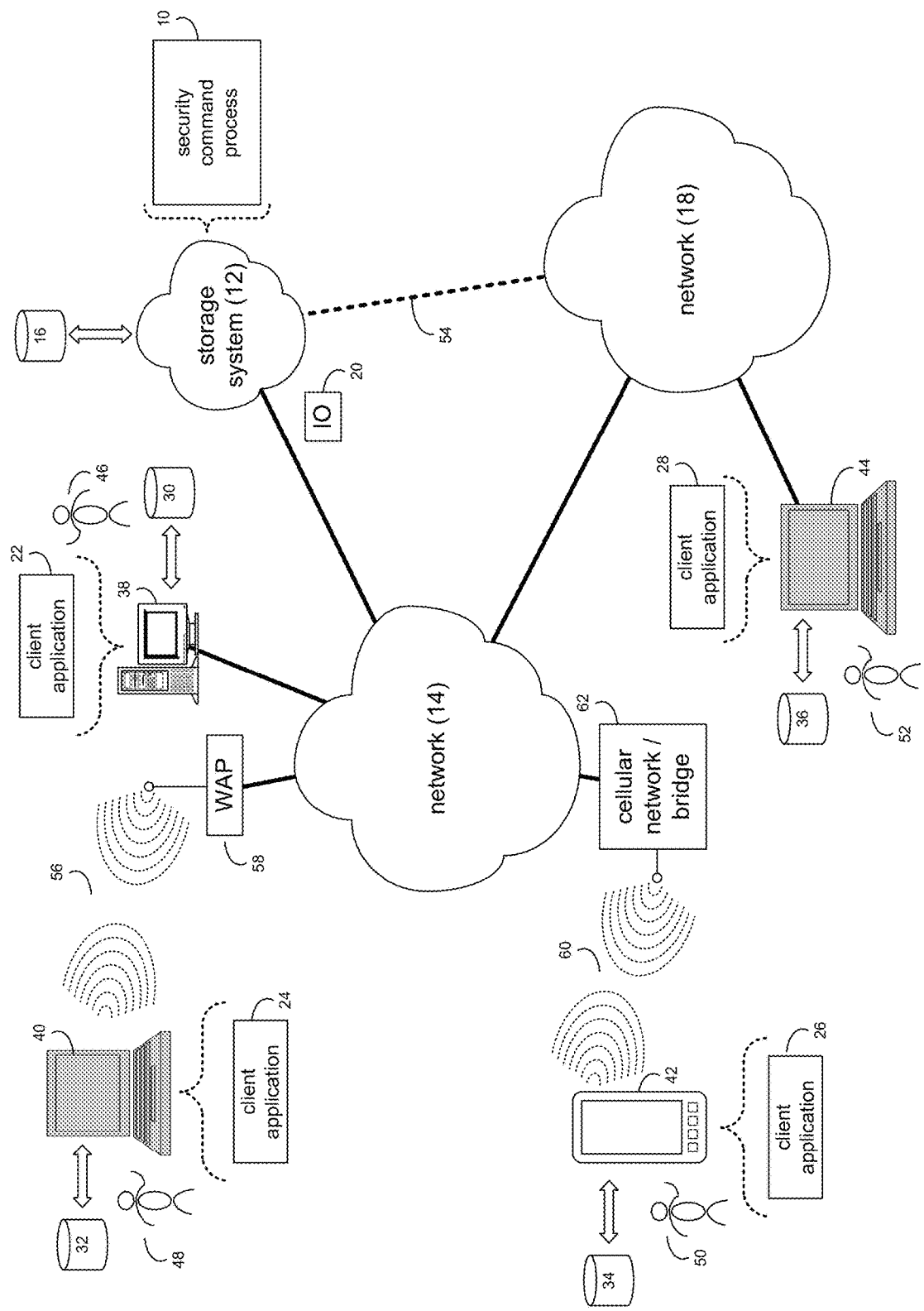
FIG. 1 is an example diagrammatic view of a storage system and a security command process coupled to a distributed computing network according to one or more example implementations of the disclosure.

System Overview:

Referring to FIG. 1, there is shown security command process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of security command process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices. Additionally/alternatively, some portions of the instruction sets and subroutines of security command process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a security command process, such as security command process 10 of FIG. 1, may include but is not limited to, receiving content for securely transmitting from an initiator device across a fabric to a target device. The content may be encrypted with a predefined encryption key, thus defining encrypted content. The encrypted content may be encapsulated in a Non-volatile Memory Express (NVMe)

Over Fabrics (NVMe-oF) command, thus defining an encapsulated NVMe-oF security command. The encapsulated NVMe-oF security command may be transmitted across the fabric to the target device.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
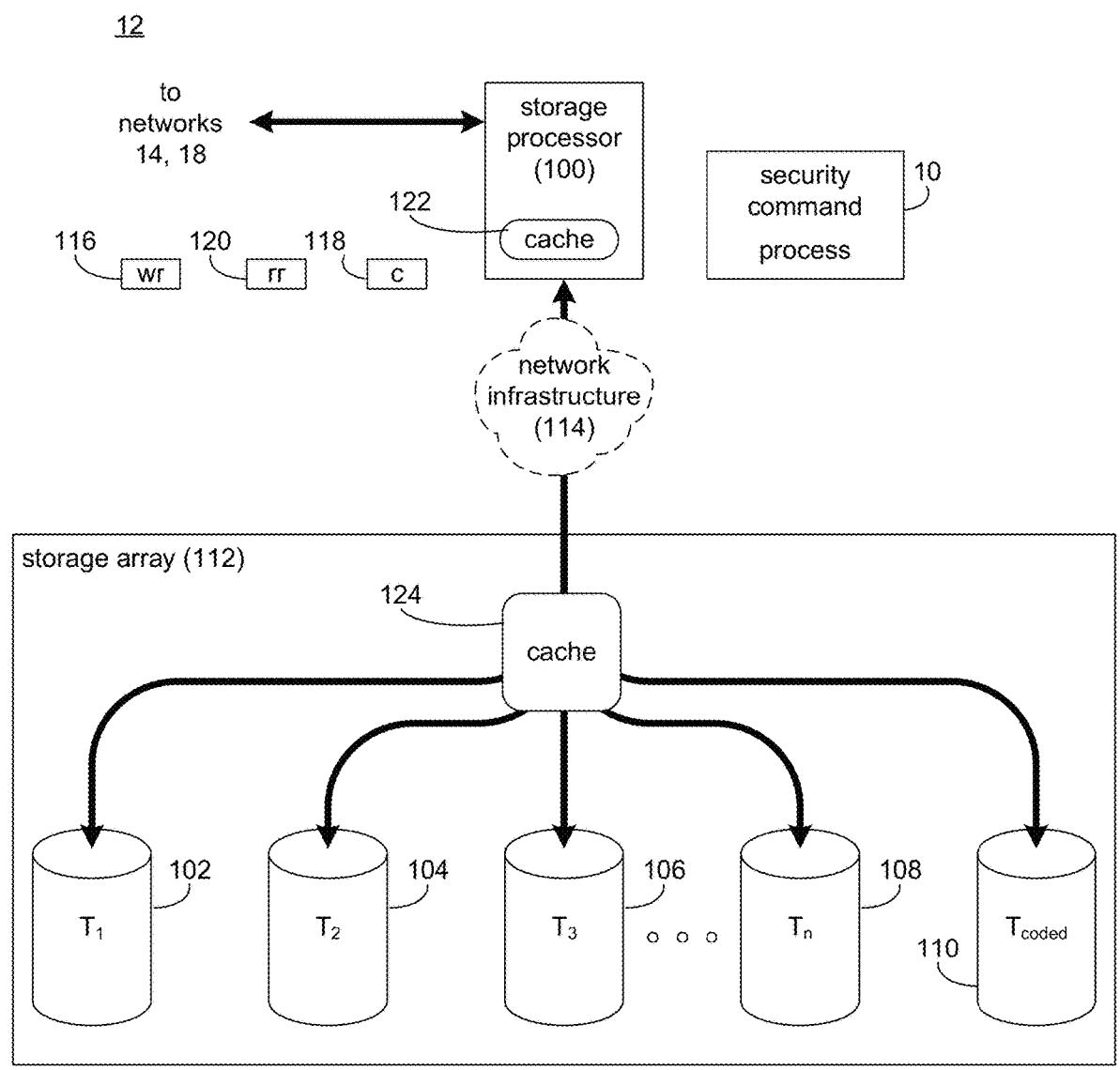
FIG. 2 is an example diagrammatic view of the storage system of FIG. 1 according to one or more example implementations of the disclosure.
Figure 3:
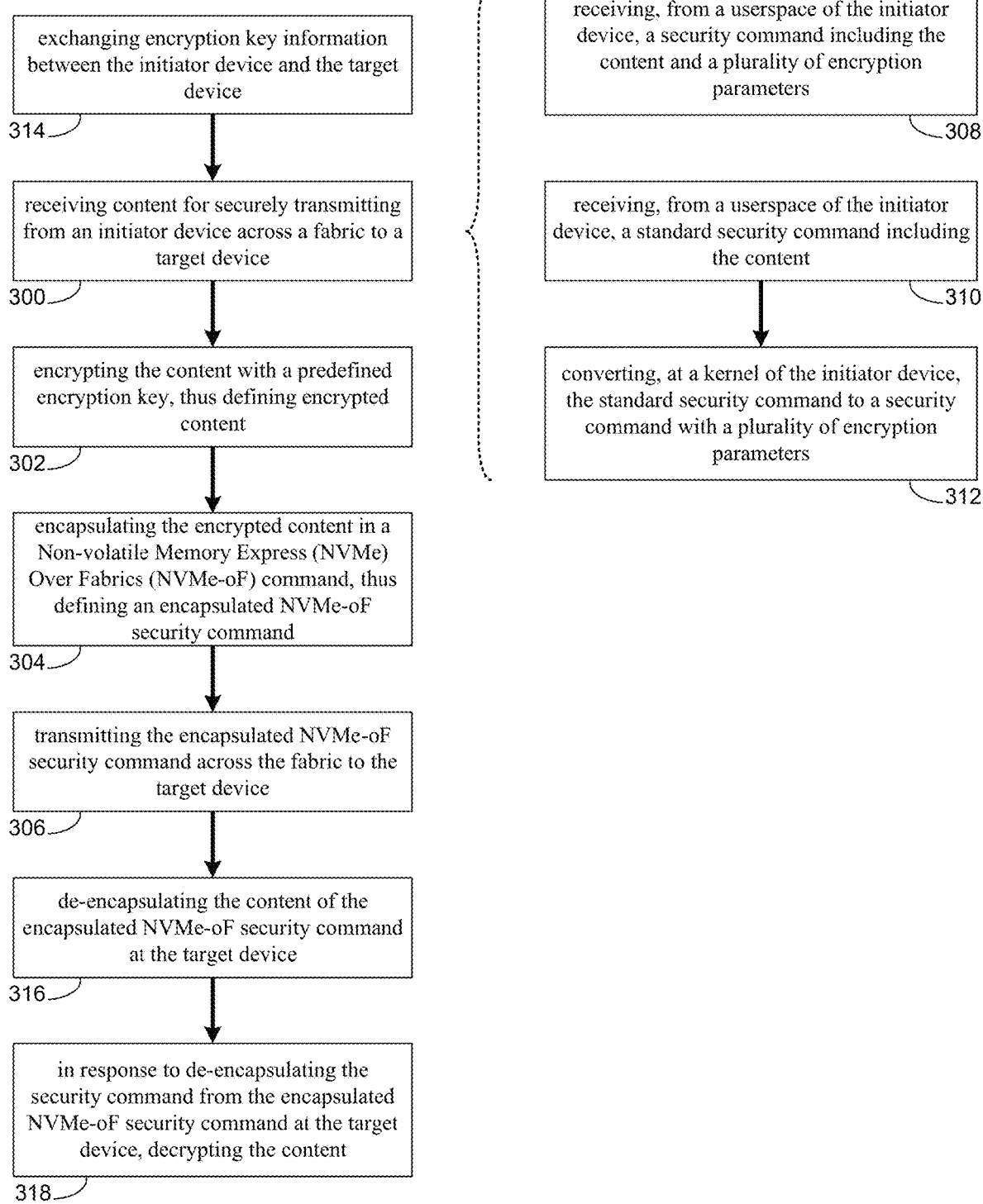
FIG. 3 is an example flowchart of security command process according to one or more example implementations of the disclosure.

The Storage System:

Referring also to FIG. 2, storage system 12 may include storage processor 100 and a plurality of storage targets T 1–n (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for example purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form storage array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of security command process 10. The instruction sets and subroutines of security command process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices. As discussed above, some portions of the instruction sets and subroutines of security command process 10 may be stored on storage devices (and/or executed by processors and memory architectures) that are external to storage system 12.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to storage array 112 (if frontend cache memory system 122 is configured as a write-through cache) or may subsequently write content 118 to storage array 112 (if frontend cache memory system 122 is configured as a write-back cache).

Storage array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of storage array 112, content 118 to be written to storage array 112 may be received from storage processor 100. Storage array 112 may initially store content 118 within backend cache memory system 124 prior to being stored on e.g. one or more of storage targets 102, 104, 106, 108, and coded target 110.

As discussed above, the instruction sets and subroutines of security command process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of security command process 10 may be executed by one or more processors (not shown) and one or more memory architectures (not shown) included within storage array 112.

Further and as discussed above, during the operation of storage array 112, content (e.g., content 118) to be written to storage array 112 may be received from storage processor 100 and initially stored within backend cache memory system 124 prior to being stored on e.g. one or more of storage targets 102, 104, 106, 108, 110. Accordingly, during use of storage array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

The Security Command Process:

Referring also to the examples of FIGS. 3-6 and in some implementations, security command process 10 may receive 300 content for securely transmitting from an initiator device across a fabric to a target device. The content may be encrypted 302 with a predefined encryption key, thus defining encrypted content. The encrypted content may be encapsulated 304 in a Non-volatile Memory Express (NVMe) Over Fabrics (NVMe-oF) command, thus defining an encapsulated NVMe-oF security command. The encapsulated NVMe-oF security command may be transmitted 306 across the fabric to the target device.

As will be discussed in greater detail below, implementations of the present disclosure may allow for the transporting of sensitive content over NVMe-oF regardless of operating system, without requiring any drive-specific functionality on the target and on fabrics without any kind of pre-existing transport encryption. As discussed above, storage centers are moving from large monolithic storage arrays to evermore decentralized storage. One such innovation with Non-volatile Memory Express (NVMe) devices is the ability to process NVMe commands and send them from a host system over fabric to a drive installed on a remote system. This can be done with minimal changes to the initiating host's kernel and no apparent changes to its userspace applications. Further, NVMe self-encrypting drives (SEDs) that comply to Trusted Computing Group's (TCG) Opal Specification satisfy the common business requirement for data at rest encryption (D@RE) by using a media encryption key (MEK) to encrypt the data on the storage media and allowing access to the data through the IO interface only after a shared secret passphrase, known as a PIN, has been provided by the host, authenticating it. Unfortunately, conventional fabrics do not supply transport encryption. Accordingly, implementations of the present disclosure allow for transporting of these secrets or other non-IO sensitive content over NVMe-oF regardless of operating system, not requiring any drive-specific functionality on the target, and on fabrics without any kind of pre-existing transport encryption.

In some implementations, security command process 10 may receive 300 content for securely transmitting from an initiator device across a fabric to a target device. For example and as discussed above, a storage array may include a plurality of self-encrypting drives. As is known in the art, a self-encrypting drive may generally include a hard disk drive (HDD) or solid state drive (SSD) with an encryption circuit built into the drive. The self-encrypting drive transparently encrypts all data written to the media and, when unlocked, transparently decrypts all data read from the media.

Figure 4:
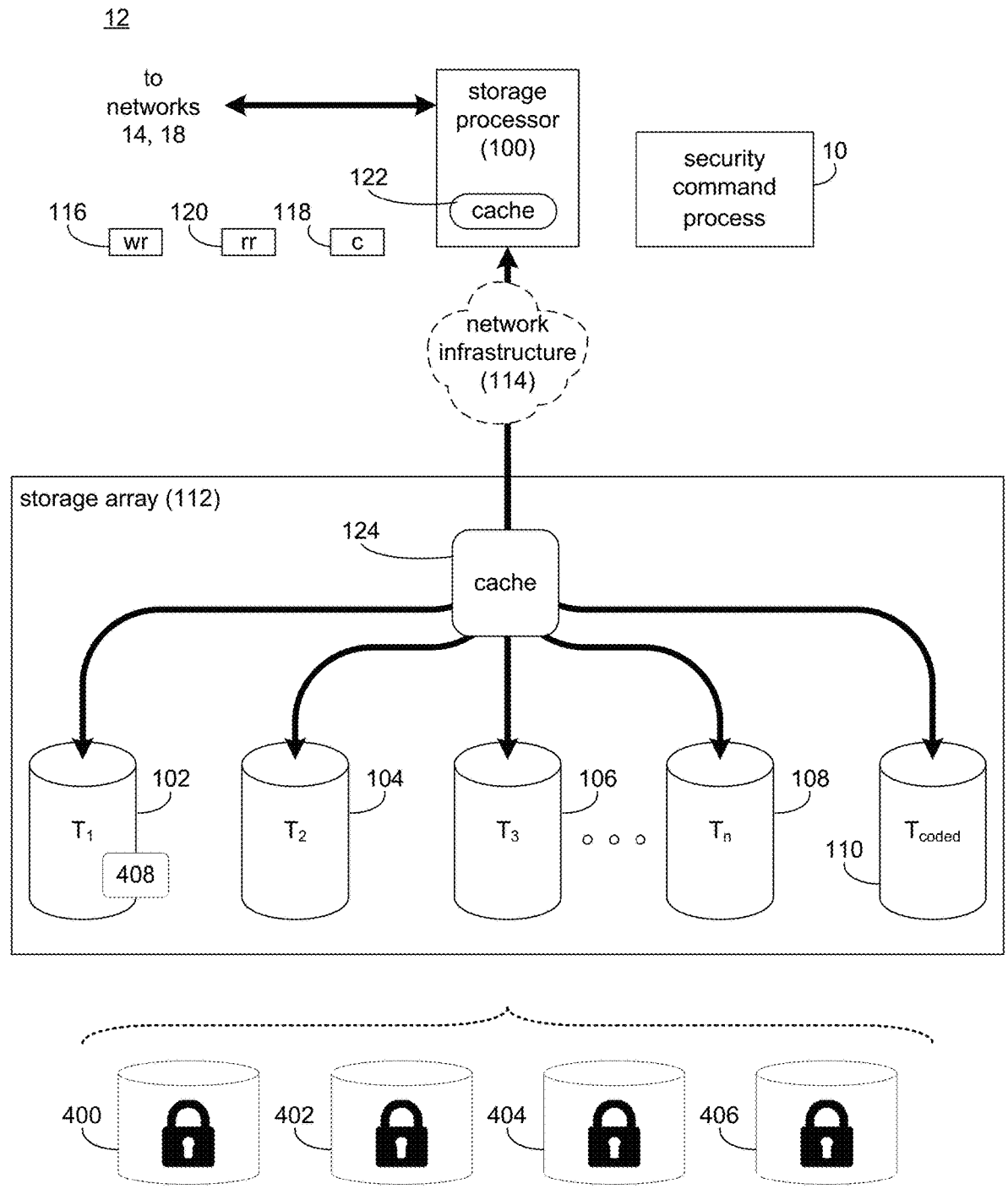
FIGS. 4-6 are example diagrammatic views of the storage system of FIG. 1 according to various example implementations of the disclosure.

Referring also to FIG. 4 and in some implementations, storage array 112 may include a plurality of self-encrypting drives (e.g., self-encrypting drives 400, 402, 404, 406) configured to store data. While the example of FIG. 4 includes e.g., four self-encrypting drives, it will be appreciated that this is for example purposes only and that storage array 112 may include any number of self-encrypting drives within the scope of the present disclosure. In some implementations, each self-encrypting drive (e.g., self-encrypting drives 400, 402, 404, 406) may be configured to be locked to storage array 112 with a unique secure ID (SID) (e.g., SID 408). Accordingly, with SID 408, self-encrypting drives 400, 402, 404, 406 may be accessible by storage array 112.

As discussed above, NVMe self-encrypting drives (SEDs) that comply with Trusted Computing Group's (TCG) Opal Specification satisfy the common business requirement for data at rest encryption (D@RE) by using a media encryption key (MEK) to encrypt the data on the storage media and allowing access to the data through the IO interface only after a shared secret passphrase, known as a PIN, has been provided by the host, authenticating it. Conventional approaches fail to preserve the private nature of this sensitive content, thus failing to provide secure D@RE. Accordingly, security command process 10 may receive 300 content (e.g., sensitive security information for accessing a plurality of self-encrypting drives) for securely transmitting from an initiator device across the fabric to a target device. While one example of content being a SED PIN has been described, it will be appreciated that this is for example purposes only. However, it will also be appreciated that, in some implementations, content may be limited to transmitting administrative commands and not input/output (TO) commands. As such and in this example, the overhead associated with implementations of the present disclosure may not reduce storage system efficiency when transmitting encapsulated administrative commands across the fabric.

An initiator device may generally include a "host" computing device which initiates communication (e.g., IO commands, administrative commands, etc.) with a target device. A target device may generally include a storage endpoint which can be a virtual drive (e.g., an NVMe drive) as presented by the virtualization layer on the host device, an actual physical target on the remote system, or both when the refer to the same physical target. However, it will be appreciated that the roles of initiator device and target device may be reversed when relaying commands between various devices. In some implementations, the fabric may include a NVMe Over Fabrics (NVMe-oF) storage environment. As is known in the art, NVMe Over Fabrics (NVMe-oF) is a set of standardized protocols for interconnecting hosts and storage systems and is achieved by presenting remote NVMe targets as if they were local to the host or initiator, and encapsulates NVMe commands over different unrelated network types referred to more abstractly as "fabrics". For example, the NVMe-oF storage environment may include one or more of: a Transmission Control Protocol (TCP) fabric; a Fibre Channel (FC) fabric; and a Random Direct Memory Access (RDMA) fabric. As is known in the art, TCP fabric or TCP layer may generally include a fabric of computing devices configured to transport data across the fabric under the Transmission Control Protocol. AFC fabric may generally include a fabric of computing devices configured to transport data across the fabric under the Fibre Channel protocol where devices are connected to each other through one or more Fibre Channel switches. An RDMA fabric or RDMA over converged Ethernet (RoCE) may generally include a fabric configured to transport data across the fabric using remote direct memory access (RDMA) over an Ethernet network. While three examples of fabric types have been described, it will be appreciated that any fabric type compliant with the requirements of NVMe-oF may be used within the scope of the present disclosure.

In some implementations, receiving 300 the content may include receiving 308, from a userspace of the initiator device, a standard security command including the content. For example, security command process 10 may utilize a new security command (e.g., a new NVMe command) such that existing NVMe commands are undisturbed. In some implementations, the security command may include a plurality of encryption parameters or subcommands that provide for encrypted transmission of sensitive content over any type of fabric in an NVMe-oF storage environment. In one example, the security command may be a command of a Vendor Specific Admin Command format in the NVMe Specification. For example, the NVMe Specification reserves admin command opcodes C0h through FFh for vendor-unique command implementations. It also reserves status codes C0h through FFh for vendor-unique statuses. In this example, the initiator device may be configured for generating the security message using the content based on a number of policies.

For example, policies for communicating between an initiator device and a target device may be configured at any point in time before and/or during the transmitting content to the target device. These policies may include user-configurable policies and/or default policies for dynamically allowing or restricting the pass-through of existing or standard security commands that contain sensitive data. This may be configured/enforced on a per-link basis or global to the entire storage system. This may be useful during a configuration period or to provide backward compatibility for specific hosts (per-link). The implementer may configure several policies that change the encryption behavior on the storage system including, for example: a key rollover policy (i.e., that sets an optional interval in which the ephemeral encryption key is changed, or only change on reboot, or reconnect to target device); a disable cleartext security command policy (i.e., a policy that disables the security commands that carry a cleartext payload and only use the new command with encrypted payload); a disable all security commands policy (i.e., for export/import restricted markets, it may be desirable to prevent any encryption); an automatically convert cleartext commands policy (i.e., preexisting insecure commands are automatically converted to the new security command seamlessly to the userspace application (i.e. without any application code changes)); and a set encryption algorithm details policy (i.e., to choose a cipher suite, digest type, and key strength for the encryption key). While several examples of policies have been described, it will be appreciated that these are for example purposes only and that any number or type of policies may be configured between an initiator device and a target device within the scope of the present disclosure.

In some implementations, security command process 10 may initialize a request to transmit secure content from the initiator device across the fabric to a target device. In one example, the request may include a copy of the PIN of a self-encrypting drive that is required to access the contents of the self-encrypting drive. Accordingly, security command process 10 may include the PIN as the content for transmitting across the fabric to the target device (e.g., the self-encrypting drive). In this example, security command process 10 may provide the content (e.g., the PIN for the self-encrypting drive) as a payload in the "new" security command. For example and referring also to FIG. 5, suppose that an application on a initiator device or host (e.g., initiator device 500) seeks to access data from a self-encrypting drive (e.g., self-encrypting drive 406). In this example, initiator device 500 may provide the PIN (e.g., PIN 408) for self-encrypting drive 406. As such, userspace of initiator device 500 may generate a security command (e.g., security command 502) with the content (e.g., PIN 408). As discussed above, security command 502 may include various encryption parameters for encrypting and encapsulating the content (e.g., PIN 408). In some implementations, receiving 300 the content may include receiving 310, from a userspace of the initiator device, a standard security command including the content; and converting 312, at a kernel of the initiator device, the standard security command to a security command with a plurality of encryption parameters. For example, the NVMe Specification describes standard security messages (i.e., "Security Send (81h)" and "Security Receive (82h)") configured to transfer security protocol data to and from an NVMe controller. As discussed above, these standard security messages lack the ability to secure or encrypt content across the fabric. To address these limitations, security command process 10 may receive 310, from a userspace of the initiator device, a standard security command, and may convert 312 the standard security command to the security message with the content and the plurality of encryption parameters discussed above. In this manner, the userspace may be "unaware" of the new NVMe security commands discussed above and, as such, may utilize standard security commands to provide the content for encrypting and encapsulating in an NVMe-oF security command. For example and referring also to FIG. 6, security command process 10 may generate a standard security command (e.g., standard security command 600) with the content (e.g., PIN 408). In this example, security command process 10 may provide standard security command 600 to the kernel of initiator device 602. Security command process 10 may convert 312 standard security message 600 into a security message as discussed above (e.g., security message 502) with a plurality of encryption parameters. In this manner, security command process may account for both "aware" and "unaware" userspaces by converting standard security messages at the kernel of the initiator device.

In some implementations, security command process 10 may exchange 314 encryption key information between the initiator device and the target device. For example and as discussed above, security command process 10 may allow for the encryption of secure content (e.g., self-encrypting drive PIN information or other sensitive content) in a manner that is not limited by or bespoke to the fabric utilized between the initiator device and the target device. The exchanging of encryption key information may be implemented in various ways including, but not limited to, a variant of ephemeral Diffie-Hellman (DHE) or ephemeral Elliptic Curve Diffie-Hellman (ECDHE) exchanged over the fabric using a reserved subcommand of the "new" NVMe security command defined in this disclosure, or may be exchanged completely out of band such as by using SSH/SCP to copy the key over, (manual or automatic entry through a REST web interface), or entered in a web management GUI over an SSL connection. In some implementations, the encryption key may only be used to encrypt data "in flight" (i.e., during transmitting across the fabric). As such, the encryption key may be ephemeral (i.e., have no need to persist nor have privacy concerns related to its secure storage). In some implementations with ephemeral keys, the key value may change at any time, allowing it to be automatically rolled (i.e., updated to a new value) on predefined intervals, on every login/connection to the storage system, or manually triggered rollover (e.g., as a precaution after suspected breach). With ephemeral keys, it may be simple to change to different encryption standards including cipher suites, digest types, or key sizes (e.g. changing from AES-256-CBC to AES-256-XTS, HMAC-MD5 to HMAC-SHA3-256, or higher bit level keys).

Referring again to FIGS. 5-6, security command process 10 may exchange 314 encryption key information between initiator device 500 and target device 504. For example, initiator device 500 and/or target device 504 may provide a request to exchange 314 an encryption key (e.g., encryption key information 506) for encrypting secure content across the fabric. As discussed above, initiator device 500 may exchange a variant of ephemeral Diffie-Hellman (DHE) or ephemeral Elliptic Curve Diffie-Hellman (ECDHE) over the fabric (e.g., fabric 506) using a reserved subcommand of the new security command (e.g., security command 502). While two examples of ephemeral encryption keys have been provided, it will be appreciated that these are for example purposes only and that any type of ephemeral encryption key may be used within the scope of the present disclosure. In some implementations, security command process 10 may exchange or re-exchange 314 encryption key information (e.g., encryption key information 506) between initiator device 500 and target device 504 at any point in time or at any interval.

In some implementations, security command process 10 may encrypt 302 the content with a predefined encryption key, thus defining encrypted content. For example, security command process 10 may utilize the previously exchanged encryption key information to encrypt the content for securely transmitting across the fabric. Referring again to FIGS. 5-6, security command process 10 may, using the userspace of initiator device 500, encrypt 302 the content (e.g., PIN 408) from security message 500 where security message 500 includes a reference to this payload. In some implementations, the payload may have logical segments separated and padded to drive block length, which may be a multiple of encryption block length. Though this may require some extra space, it accounts for transports and algorithms which may require data payload, and/or ciphertext to be block aligned and block length multiple. For example, AES uses a block size of 128 bits (e.g., 16 bytes) and most NVMe drives allow a namespace format with 512 bytes or 4096 bytes (4k native). Accordingly, security command process 10 may encrypt 302 the content (e.g., PIN 408) using the encryption key information (e.g., encryption key information 506).

Figure 5:
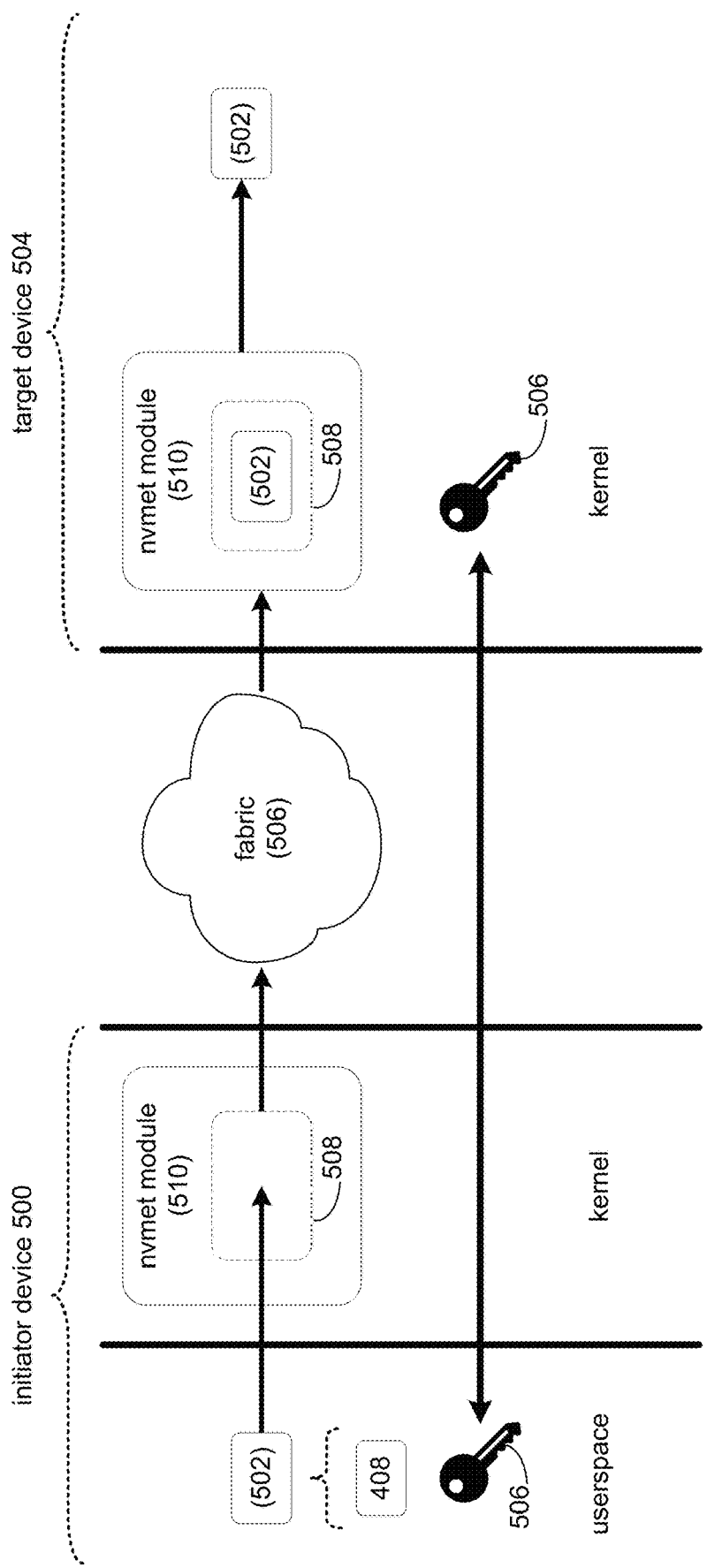
Figure 6:
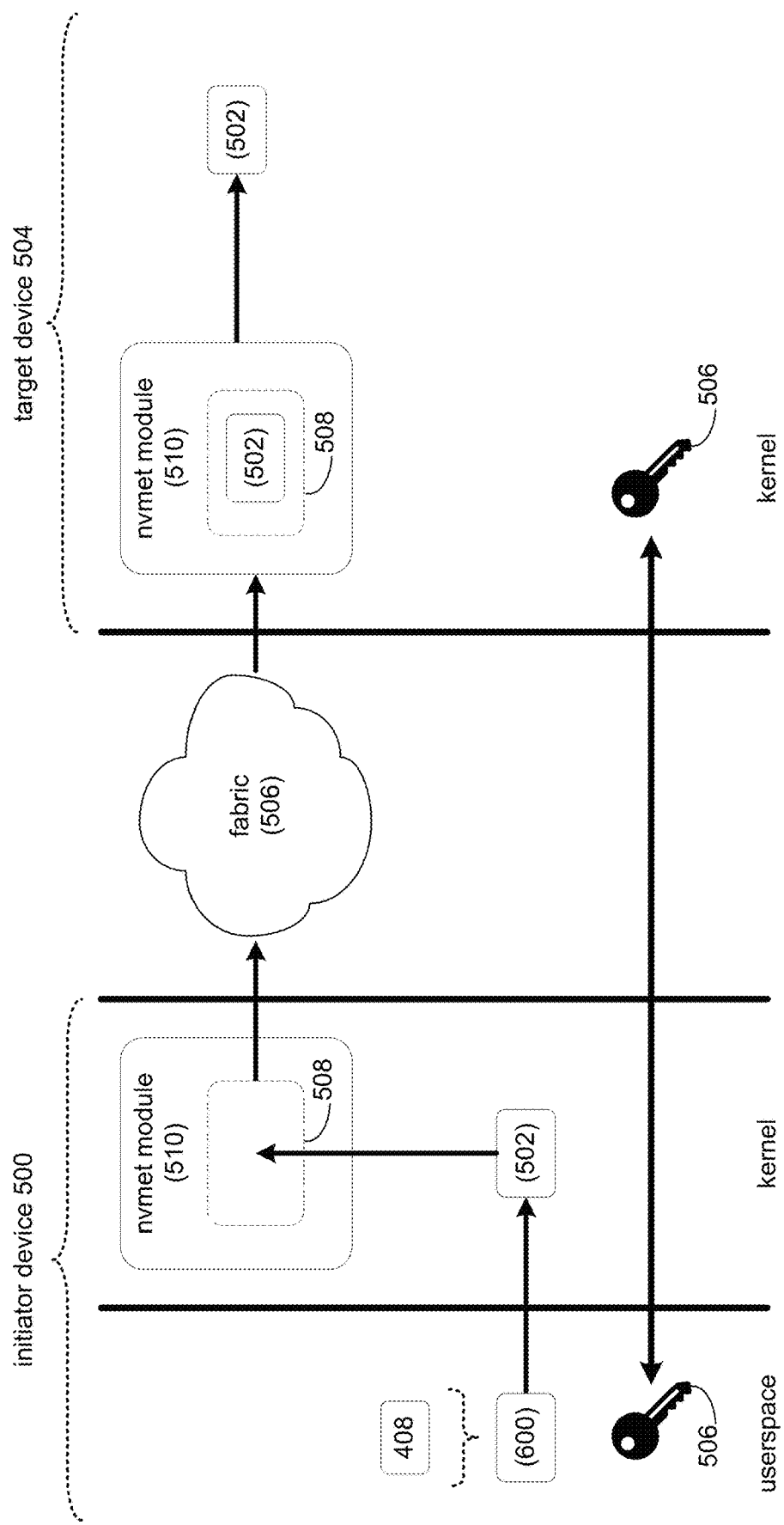

In some implementations, security command process 10 may encapsulate 304 the encrypted content in a Non-volatile Memory Express (NVMe) Over Fabrics (NVMe-oF) command, thus defining an encapsulated NVMe-oF security command. For example and as discussed above, conventional approaches for transmitting content across a fabric fail to allow for encryption of content that are not limited by the fabric type (e.g., RDMA, TCP, FC, etc.). Security command process 10 may utilize the kernel of the initiator device to encapsulate 304 the encrypted content in a NVMe-oF command. As is known in the art, a NVMe-oF command or NVMe-oF command capsule may include a submission queue entry or completion queue entry with additional data, designated for a particular fabric's transport protocol (e.g., RDMA, TCP, FC, etc.). Security command process 10 may encapsulate 304 the encrypted content in an NVMe-oF command for a particular fabric. Referring again to FIGS. 5-6, security command process 10 may, at the kernel of initiator device 500, encapsulate 304 the encrypted content (e.g., encrypted PIN 408), thus defining encapsulated NVMe-oF security command 508. As shown in FIG. 5, the kernel may include a NVMe host software module (nvmet module 510) that may encapsulate security command 502 into NVMe-oF security command 508. As shown in FIG. 6, the kernel may convert 312 the standard security command (e.g., standard security command 600) into the "new" security command discussed above (e.g., security command 502) and convert 312 the content of the security command using the encryption key information (e.g., encryption key information 506). Security command process 10 may encapsulate 304 the encrypted content into encapsulated NVMe-oF security command 508.

In some implementations, encapsulating 304 the encrypted content into NVMe-oF security command (e.g., NVMe-oF security command 508) may include encapsulating the encrypted content into a capsule for a particular fabric. As discussed above, by utilizing a NVMe-oF command, security command process 10 may encapsulate the encrypted content for a particular fabric's transport protocol (e.g., RDMA, TCP, FC, etc.). In this manner, security command process 10 may encrypt the content using the same encryption key information for any type of NVMe-oF fabric (e.g., RDMA fabric, TCP fabric, or FC fabric). Accordingly, security command process 10 may allow the encrypted content to be transported across any fabric type without requiring fabric-specific processing or fabric-specific encryption.

In some implementations, security command process 10 may transmit 306 the encapsulated NVMe-oF security command across the fabric to the target device. For example and as discussed above, security command process 10 may transmit 306 encapsulated NVMe-oF security command 508 across fabric 506 to the target device (e.g., target device 504). As discussed above, by encapsulating 304 encrypted content (e.g., PIN 408) in a NVMe-oF command (e.g., NVMe-oF security command 508), NVMe-oF security command 508 may be transmitted 306 across fabric 506 to target device 504 in a command capsule specific to the particular fabric (e.g., fabric 506). As the content is encrypted within NVMe-oF security command 508, the content may be secure while "in flight" in fabric 506.

In some implementations, security command process 10 may de-encapsulate 316 the content of the encapsulated NVMe-oF security command at the target device. For example, the target device may receive the command capsule (e.g., NVMe-oF security command 508), strip off the NVMe-oF encapsulation layer, and put the resulting NVMe command (e.g., security command 502) in the appropriate NVMe submission queue for the target device (e.g., target device 504) indicated in the encapsulation. In response to de-encapsulating 316 the security command from the encapsulated NVMe-oF security command at the target device, security command process 10 may decrypt 318 the content. For example, once security command 502 is de-encapsulated 316 from NVMe-oF security command 508, security command process 10 may access the encrypted content and decrypt the content to access the original content (e.g., PIN 408).

Accessing the original content may include processing the decrypted security command. In one example, a worker thread of the target device may process the security command on the NVMe submission queue and may send the status back via the NVMe completion queue. In another example, security command process 10 may prepare and dispatch a standard security command (e.g., security send (81h) or security receive (82h)) depending on whether particular encryption parameters (e.g., an "Encrypted Security Send (sub 1h)" parameter or an "Encrypted Security Recv (sub 2h)" parameter) are specified in the security command. The standard security command may be dispatched to a physical backend drive and the status may be sent back by enqueuing a response on a NVMe completion queue. In another example, security command process 10 may fail if a subcommand is not defined, returning the result back in the completion queue.

While FIGS. 5-6 demonstrate initiator device 500 as a host or storage processor and target device as a NVMe storage device, it will be appreciated that initiator device 500 may represent any source or initiator of NVMe administrative commands (e.g., submission queue commands or completion queue commands). Accordingly, a device may be an initiator device for a submission command and a target device for a completion command. As such, any examples of an initiator device as a host or storage processor is for example purposes only.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:
   initializing a request to transmit content from an initiator device across a fabric to a target device;
   receiving content for accessing a plurality of self-encrypting drives for securely transmitting from the initiator device across the fabric to the target device;
   encrypting the content with a predefined encryption key, thus defining encrypted content;
   encapsulating the encrypted content in a Non-volatile Memory Express (NVMe) Over Fabrics (NVMe-oF) command, wherein the NVMe-OF command is a standard security message from a NVMe Specification, thus defining an encapsulated NVMe-OF security command; and
   transmitting the encapsulated NVMe-OF security command across the fabric to the target device,
   wherein transmitting the content over the NVMe-oF command is independent of an operating system, any fabric type without requiring fabric-specific processing or fabric-specific encryption and any drive-specific functionality on the target device and on the fabric.

2. The computer-implemented method of claim 1, wherein the fabric includes a NVMe Over Fabrics (NVMe-oF) storage environment.

3. The computer-implemented method of claim 1, wherein the NVMe-OF storage environment includes one or more of:
   a Transmission Control Protocol (TCP) fabric;
   a Fibre Channel (FC) fabric; and
   a Random Direct Memory Access (RDMA) fabric.

4. The computer-implemented method of claim 1, further comprising:
   exchanging encryption key information between the initiator device and the target device.

5. The computer-implemented method of claim 1, wherein receiving the content includes receiving, from a userspace of the initiator device, a security command including the content and a plurality of encryption parameters.

6. The computer-implemented method of claim 5, wherein receiving the content further includes:
   receiving, from the userspace of the initiator device, a standard security command including the content; and
   converting, at a kernel of the initiator device, the standard security command to the encapsulated NVMe-OF security command with the plurality of encryption parameters.

7. The computer-implemented method of claim 1, further comprising:
   de-encapsulating the content of the encapsulated NVMe-OF security command at the target device.

8. The computer-implemented method of claim 1, further comprising:
   in response to de-encapsulating the security command from the encapsulated NVMe-oF security command at the target device, decrypting the content.

9. A computer program product residing on a non-transitory computer readable medium having a plurality of instructions stored thereon which, when executed by a processor, cause the processor to perform operations comprising:
   initializing a request to transmit content from an initiator device across a fabric to a target device;
   receiving content for accessing a plurality of self-encrypting drives for securely transmitting from the initiator device across the fabric to the target device;
   encrypting the content with a predefined encryption key, thus defining encrypted content;
   encapsulating the encrypted content in a Non-volatile Memory Express (NVMe) Over Fabrics (NVMe-oF) command, wherein the NVMe-OF command is a standard security message from a NVMe Specification, thus defining an encapsulated NVMe-OF security command; and
   transmitting the encapsulated NVMe-OF security command across the fabric to the target device,
   wherein transmitting the content over the NVMe-OF command is independent of an operating system, any fabric type without requiring fabric-specific processing or fabric-specific encryption and any drive-specific functionality on the target device and on the fabric.

10. The computer program product of claim 9, wherein the fabric includes a NVMe Over Fabrics (NVMe-oF) storage environment.

11. The computer program product of claim 9, wherein the NVMe-OF storage environment includes one or more of:
a Transmission Control Protocol (TCP) fabric;
a Fibre Channel (FC) fabric; and
a Random Direct Memory Access (RDMA) fabric.

12. The computer program product of claim 9, wherein the operations further comprise:
exchanging encryption key information between the initiator device and the target device.

13. The computer program product of claim 9, wherein receiving the content includes receiving, from a userspace of the initiator device, a security command including the content and a plurality of encryption parameters.

14. The computer program product of claim 13, wherein receiving the content further includes:
receiving, from the userspace of the initiator device, a standard security command including the content; and
converting, at a kernel of the initiator device, the standard security command to the encapsulated NVMe-OF security command with the plurality of encryption parameters.

15. The computer program product of claim 9, wherein the operations further comprise:
de-encapsulating the content of the encapsulated NVMe-oF security command at the target device.

16. A computing system comprising:
a memory; and
a processor configured to initialize a request to transmit content from an initiator device across a fabric to a target device, wherein the processor is further configured to receive content for accessing a plurality of self-encrypting drives for securely transmitting from the initiator device across the fabric to the target device, wherein the processor is further configured to encrypt the content with a predefined encryption key, thus defining encrypted content, wherein the processor is further configured to encapsulate the encrypted content in a Non-volatile Memory Express (NVMe) Over Fabrics (NVMe-oF) command, wherein the NVMe-OF command is a standard security message from a NVMe Specification, thus defining an encapsulated NVMe-OF security command, wherein the processor is further configured to transmit the encapsulated NVMe-OF security command across the fabric to the target device, and wherein transmitting the content over the NVMe-oF command is independent of an operating system, any fabric type without requiring fabric-specific processing or fabric-specific encryption and any drive-specific functionality on the target device and on the fabric.

17. The computing system of claim 16, wherein the fabric includes a NVMe Over Fabrics (NVMe-oF) storage environment.

18. The computing system of claim 16, wherein the NVMe-OF storage environment includes one or more of:
a Transmission Control Protocol (TCP) fabric;
a Fibre Channel (FC) fabric; and
a Random Direct Memory Access (RDMA) fabric.

19. The computing system of claim 16, wherein the processor is further configured to:
exchange encryption key information between the initiator device and the target device.

20. The computing system of claim 16, wherein receiving the content includes:
receiving, from a userspace of the initiator device, a security command including the content and a plurality of encryption parameters;
receiving, from the userspace of the initiator device, a standard security command including the content; and
converting, at a kernel of the initiator device, the standard security command to the encapsulated NVMe-OF security command with the plurality of encryption parameters.

* * * * *